(12) United States Patent
Hofmann et al.

(10) Patent No.: US 6,390,258 B1
(45) Date of Patent: May 21, 2002

(54) FLOATING ROD GUIDE FOR MONOTUBE STRUT

(75) Inventors: Randall L. Hofmann, Centerville; Steven R. Robinson, Franklin; Michael W. Hurtt, Waynesville, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/917,297

(22) Filed: Jul. 27, 2001

(51) Int. Cl.[7] .................................................. F16F 9/36

(52) U.S. Cl. ............................. 188/322.17; 188/322.16

(58) Field of Search ....................... 188/322.15–322.19, 188/322.22

(56) References Cited

U.S. PATENT DOCUMENTS

| 4,647,026 | A | * | 3/1987 | Siemann et al. .......... 267/64.15 |
| 5,115,892 | A | * | 5/1992 | Yamaoka et al. ............ 188/282 |
| 5,178,243 | A | * | 1/1993 | Hamada et al. ......... 188/322.17 |
| 5,277,284 | A | * | 1/1994 | Pradel et al. ........... 188/322.17 |
| 5,454,455 | A | * | 10/1995 | Kundmuller et al. .. 188/321.11 |
| 5,531,299 | A | * | 7/1996 | Bataille ................. 188/322.17 |
| 5,984,060 | A |   | 11/1999 | Clark et al. |
| 6,318,526 | B1 | * | 11/2001 | Kruckemeyer et al. 188/322.17 |

* cited by examiner

Primary Examiner—Christopher P. Schwartz
(74) Attorney, Agent, or Firm—Scott A. McBain

(57) ABSTRACT

A guide assembly for a rod of a motor vehicle strut comprises a rod guide, a seal cover, and a retainer. The seal cover engages the rod guide, and defames an area therebetween. The retainer is engaged with the seal cover. A first O-ring is disposed between the seal cover and the rod guide, and a second O-ring is disposed between the rod guide and the retainer.

20 Claims, 3 Drawing Sheets

FLOATING ROD GUIDE FOR MONOTUBE STRUT

TECHNICAL FIELD OF THE INVENTION

The present invention relates to monotube strut assemblies, and more particularly to a floating rod guide for a monotube strut.

BACKGROUND OF THE INVENTION

A strut is a type of damper that is used in vehicle suspensions as both a damping device for providing shock absorbing functions and as part of the suspension's load-bearing structure. Monotube gas-charged dampers are known wherein a piston with a connected piston rod is slidably carried in a fluid-filled tube with a separate piston called a gas cup slidably carried in the tube on an opposite side of the piston from the rod. The gas cup separates a compressible gas charge from the fluid within the damper. It is known that monotube gas-charged dampers exhibit desirable performance characteristics when used in some suspension assemblies.

Typically, the generic monotube strut design configuration is produced primarily as an aftermarket replacement damper, although limited original equipment (OEM) applications have been implemented. The prior art device generally includes a bearing mechanism that includes a combination of a polytetrafluoroethelyne laminated plain bearing and a grease lubricant. In some applications performance advantages of high pressure monotube dampers are well known and therefore, the use of such devices without restriction would be desirable. However, in applying a monotube gas-charged strut in an OEM application, extended durability requirements lead to restrictions in the use of such devices, particularly in applications involving larger and heavier vehicles that operate with resultant increased side loading. In particular, the bearings in such a strut must be assembled and maintained in a straight and true fashion in order to obtain to the bottom of the unit. A cavity of a floating rod guide in this application may get packed with the iron particles, and lose its ability to float. Again this leads to premature rod wear and high damper axial friction.

SUMMARY OF THE INVENTION

The present invention is a guide assembly for a rod of a motor vehicle strut. The guide assembly comprises a rod guide, a seal cover, and a retainer. The seal cover engages the rod guide, and defines an area therebetween. The retainer is engaged with the seal cover. A first O-ring is disposed between the seal cover and the rod guide, and a second O-ring is disposed between the rod guide and the retainer.

Accordingly, it is an object of the present invention to provide a guide for a rod of a motor vehicle strut of the type described above which has acceptable force and friction levels.

Another object of the present invention is to provide a rod guide of the type described above which reduces the incidence of premature rod wear.

Still another object of the present invention is to provide a rod guide of the type described above which is acceptable for use in active struts, particularly those that use magneto-rheologic fluid.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
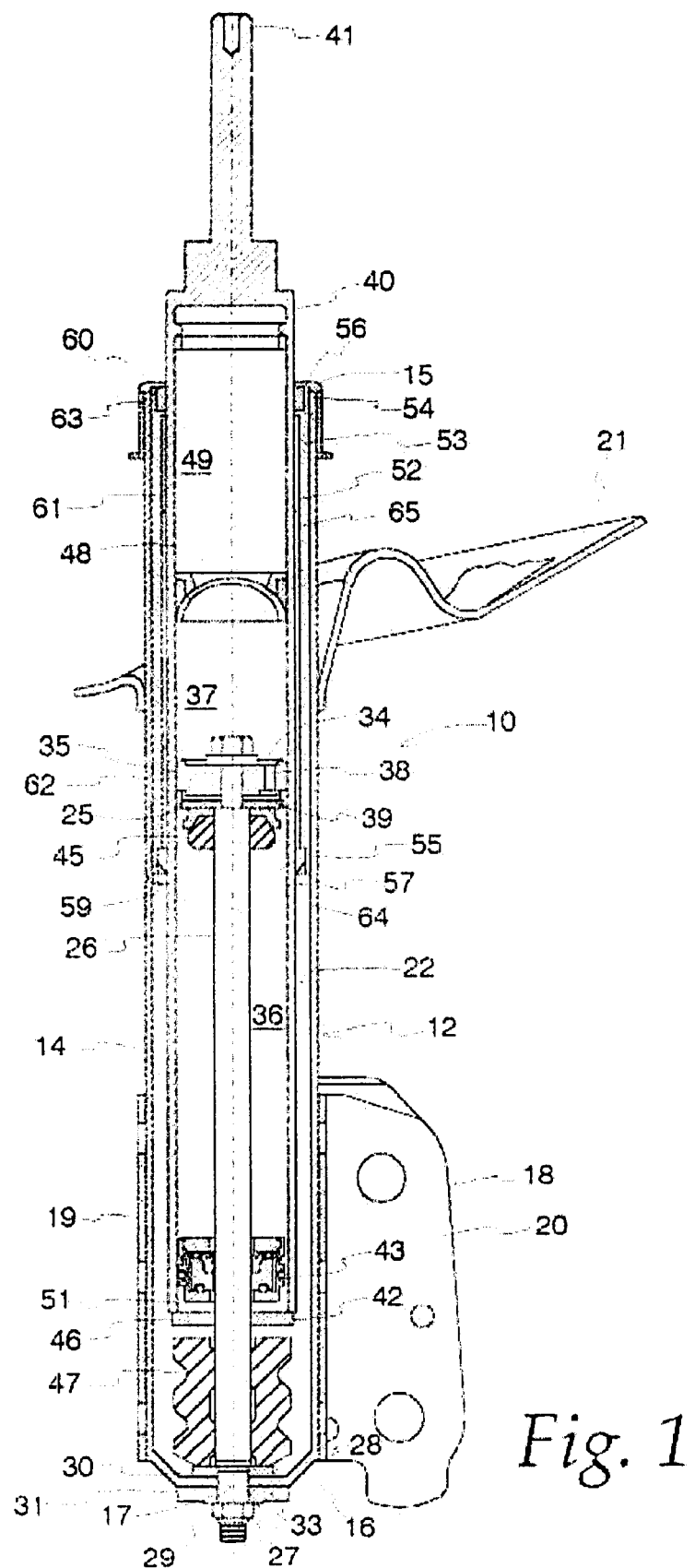
FIG. 1 is a cross-sectional view of a monotube strut including a rod guide according to the present invention.

FIG. 1 shows a monotube gas-charged suspension strut assembly 10. In general the strut 10 is designed for operation as a load-bearing and shock-absorbing device within a vehicle suspension, and is connected between the sprung (body) and unsprung (wheel assembly) masses. Strut 10 comprises a housing 12 that includes a housing tube 14 with an open end 15 and a closed end 16 that may be formed by a spin closing operation, or by welding or otherwise securing a secondary component to the housing tube 14. The closed end 16 includes an opening 17. A mounting bracket 18 includes a cylindrical body 19 that is closely received over the housing tube 14 near closed end 16 and is secured in position by a suitable means such as welding. The bracket assembly 18 also has a pair of arms 20 that exhibit suitable openings for connection to the unsprung mass of the vehicle at a location such as the steering knuckle (not illustrated). A spring seat 21 is also received on the housing tube 14 and is located in position as required by the particular application within which the strut 10 will operate. The spring seat 21 is fixed in position on the housing tube 14 by a suitable means such as welding. Further details of the housing tube are described in U.S. Pat. No. 5,984,060, the disclosure of which is hereby incorporated by reference.

A piston assembly 25 is connected to a piston rod 26 and is fixed in position within the housing tube 14. The piston rod 26 extends through the opening 17 with a reduced diameter segment 27 of the piston rod 26 captured within the opening 17 between shoulder 28 and flanged nut 29. A pair of support plates 30 and 31 are positioned on opposite sides of the closed end 16 with the support plate 30 bearing against the shoulder 28 and the support plate 31 bearing against the flange of nut 29. The support plate 30 includes an annular extension 31 that extends into the opening 17 and around the reduced diameter segment 27.

The piston assembly 25 includes a sintered steel piston body 34 that carries a band of low friction material 35 for engaging a damper body tube 40. This provides a mechanism for fluid separation between extension chamber 36 and compression chamber 37. A number of openings 38 are provided in the piston body 34, which are normally closed by a monodisc valve assembly 39. The openings 38 provide a fluid route between the extension chamber 36 and the compression chamber 37 when a sufficient force is established to deflect the valve assembly 39. As fluid flow is forced through the openings 38, the valve assembly 39 affects a selected pressure drop across the piston and a subsequent backpressure. Through this mechanism the strut 10 provides a selected damping response between the sprung and unsprung masses of the vehicle.

The damper body tube 40 is slidingly received over the piston assembly 25. Damper body tube 40 includes a first end 41 at an outboard position adapted to be connected to the sprung mass of the vehicle and includes a second end 42 at an inboard position. The end 42 is supported about the piston rod 26 by a floating rod guide assembly 43 that is fixed in position within the damper body tube 40. The upper end of the rod guide assembly 43 is adapted to contact a rebound stop that comprises one or more elastomeric bushings 45 carried adjacent the piston assembly 25. At maximum extension of the strut 10, the bushing 45 is compressed against the upper end of the rod guide assembly 43 to cushion the deceleration of strut 10. A plate 46 is carried near the rod guide assembly 43 by a bracket 51 that slips inside the end 42 of damper body tube 40. The plate 46 is adapted to contact a jounce bumper 47 that comprises an elastomeric bushing and that is positioned against the support 30 at the closed end 16 of housing tube 14 and about the piston rod 26.

A gas cup 48 is also carried in the damper body tube 40 between the piston assembly 25 and the end 41. The gas cup 48 carries a seal and slides along the inside of damper body tube 40 separating out a compensation chamber 49 from the compression chamber 37. While the extension chamber 36 and compression chamber 37 carry a supply of hydraulic fluid, the compensation chamber 49 carries a compressible nitrogen gas supply. During extension and compression directed travel of the damper body tube 40 relative to the piston assembly 25, a decreasing or an increasing volume of the piston rod 26 is contained within the damper body tube 40 depending on the stroke position of the strut assembly 10. In order to compensate for this varying volumetric amount of the piston rod 26 within the fluid-filled chambers 36 and 37, the gas cup 48 slides compressing or expanding the compensation chamber 49.

The predominate means of supporting the damper body tube 40 within the reservoir tube 14 is provided by a bearing system 52 that is designed to reduce friction and improve durability of the strut 10. The bearing system 52 includes a bearing sleeve 53 that is made of common steel in the present embodiment, and which includes a step 54 formed near its outboard end 56 and a step 55 formed near its inboard end 57. The bearing sleeve 53 is slip-fit within the housing tube 14 near end 15. Bearing sleeve 53 is maintained in position by a formed stop 59 at end 57, and by a retaining cap 60 at end 56 that is pressed onto the end of housing tube 14. The stop 59 is formed by a means such as roll-forming or dimpling.

The bearing assembly 52 also includes a pair of plain bearings 61 and 62 that are pressed into the bearing sleeve 53 with the bearing 61 positioned near end 56 and the bearing 62 positioned near end 57. A seal 63 is positioned against the step 54 and bears against the damper body tube 40. A seal 64 is positioned against the step 55 and bears against the damper body tube 40. This provides a fluid-tight chamber 65 between the bearings 61 and 62, which is filled with oil. The oil in chamber 65 is in a fluid form at room temperature and is preferably comprised of a formulated synthetic hydrocarbon based polyalphaolefinic bearing oil. This preferred oil is selected because it provides the film strength of a natural paraffinic petroleum oil with improved performance in the areas of volatility, temperature, operating range, and viscosity stability.

Figure 2:
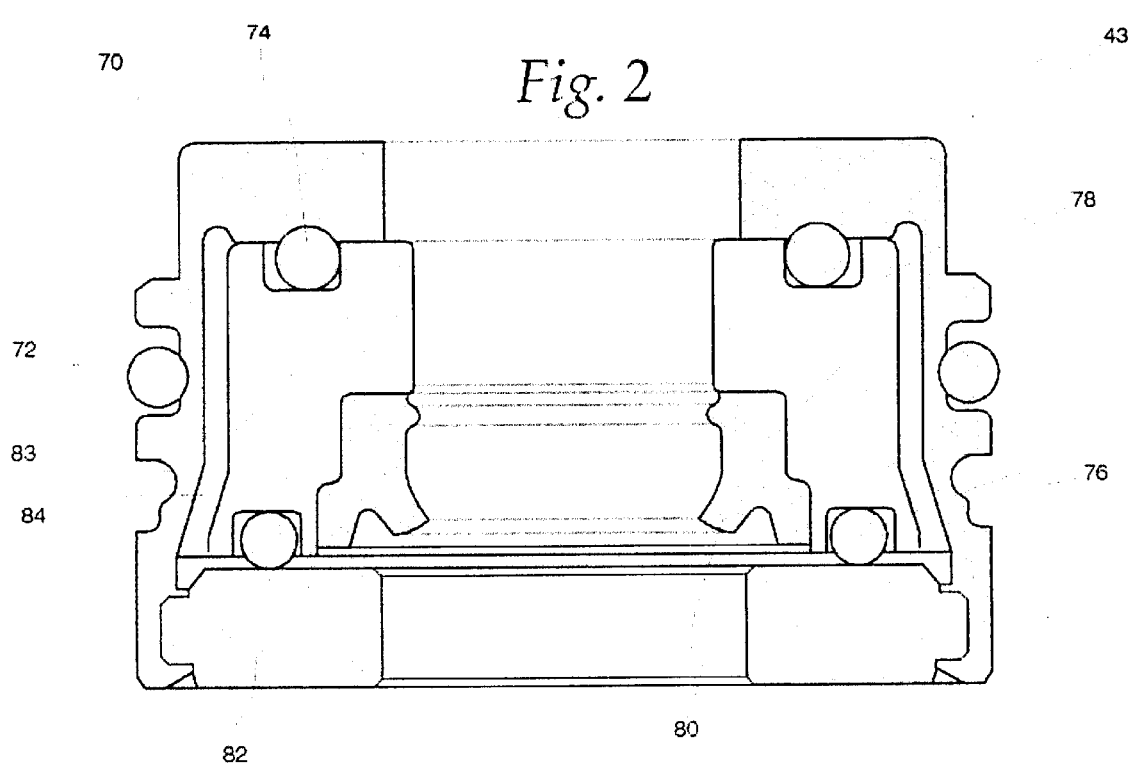
FIG. 2 is an enlarged cross-sectional view of the rod guide.

FIG. 2 shows the floating rod guide assembly 43 in greater detail. The rod guide assembly 43 includes a seal cover 70, three O-rings 72, 74 and 76, a rod guide 78, a dynamic rod seal 80, and a retainer 82. The seal cover 70 is preferrably steel, plated with Teflon impregnated nickel for reduced sliding friction and improved corrosion resistance. The seal cover 70 houses the other component parts and is attached to the inside of the cartridge tube 40 by a snap ring placed in a machined groove 83. The static O-ring seal 72 creates a seal between the outside of the seal cover 70 and the inside of the cartridge tube 40. The rod guide 78 is preferably aluminum, and may be be coated with a material that works well as a lubricated bearing for low sliding friction and good wear properties.

The annulus area 84 between the outside diameter of the rod guide 78 and the inside diameter of the seal cover 70 is filled with a grease. The O-ring seal 74 keeps the fluid and grease in the annulus area 84. The other sealing O-ring 76 also keeps the grease inside the seal cover 70, and keeps most of the fluid from mixing with the grease. Each of the O-rings 74 and 76 works as a spring to provide a pre-load to the other, and they also eliminate any noise from the rod guide 78 hitting the seal cover 70. The rod seal 80 seals the fluid inside the damper as the piston rod 26 slides in and out. The retainer 82 is crimped into the seal cover 70, and holds the rod guide 78 inside the seal cover.

When the damper is assembled and pressurized, a small amount of fluid may leak around the retainer crimp until the pressure inside the seal cover 70 is equal to the pressure inside the damper. Because the outside diameter of the rod guide 78 is smaller than the inside diameter of the seal cover 70, the rod guide can move laterally to account for any misalignment and to take up any bending of the piston rod 26. The combination of plating materials, seals, and grease allows the force needed to move the rod guide laterally to be very low. Accordingly, the present invention operates with acceptable force and friction levels and reduces the incidence of premature rod wear.

For continuously variable active dampers, the chambers 36 and 37 may be filled with a magnetorheological (MR) fluid. MR fluids normally include fine iron particles dispersed within a liquid carrier such as hydraulic oils and the like. These MR fluids exhibit a thickening behavior (a rheology change), sometimes referred to as an "apparent viscosity change", upon being exposed to a magnetic field of sufficient strength. The higher the magnetic field strength to which the MR fluid is exposed, the higher the differential pressure (flow restriction or damping force) that can be achieved within the device. A particular advantage achieved by the present invention is that the area 84 is mostly insulated from the ingress of particles in the MR fluid, thus lessening axial friction and promoting the lifetime of the part.

Figure 3:
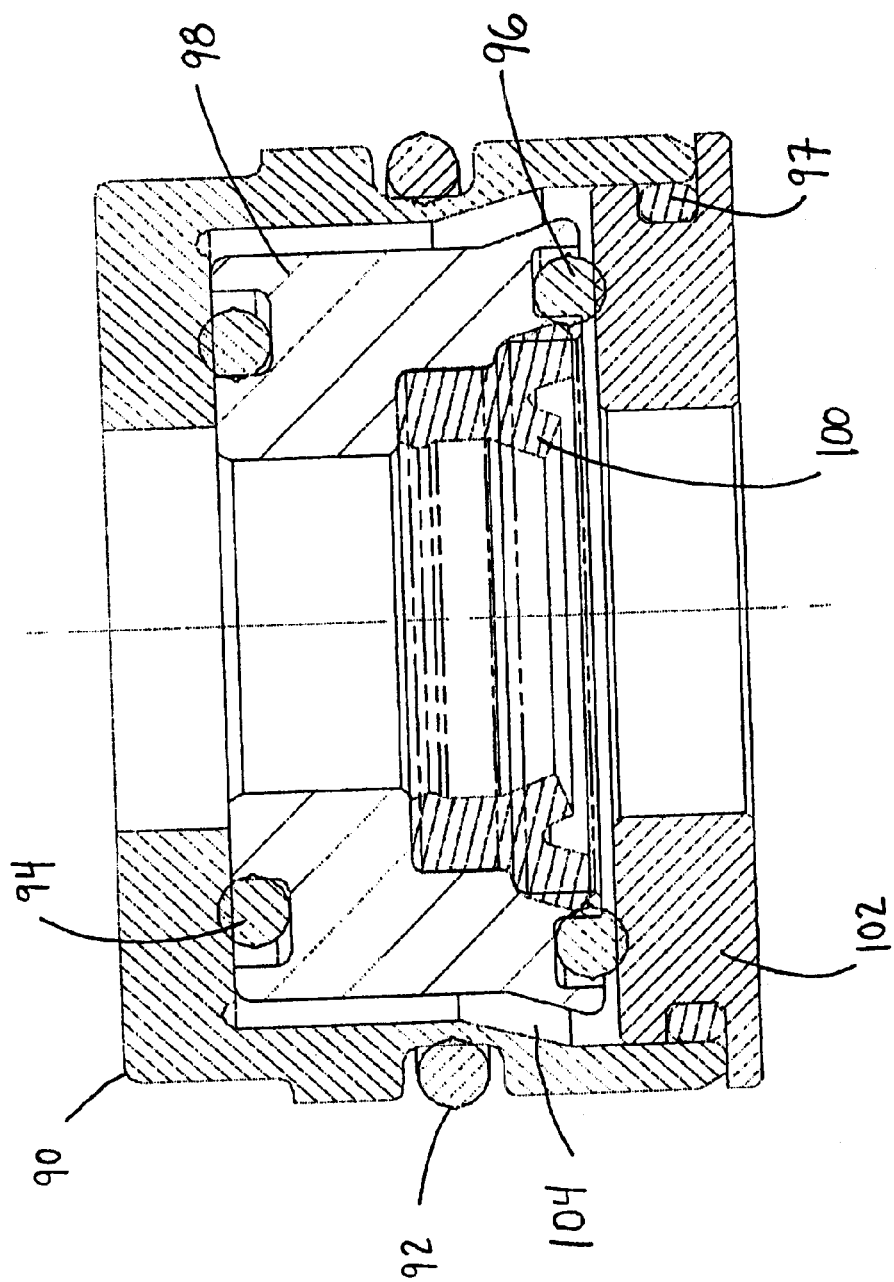
FIG. 3 is an enlarged cross-sectional view of an alternative embodiment of the rod guide.

FIG. 3 shows an alternative embodiment of the floating rod guide assembly including a seal cover 90, four O-rings 92, 94, 96 and 97, a rod guide 98, a dynamic rod seal 100, and a retainer 102. In this embodiment, the annulus area 104 between the outside diameter of the rod guide 98 and the inside diameter of the seal cover 100 is vacant, i.e. not filled with grease. An additional modification includes situation of the O-ring 97 in a groove in the retainer 102, and the press fit of the retainer into into the seal cover 90. This design may offer manufacturing advantages under certain circumstances.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A guide assembly for a rod of a motor vehicle strut, the guide assembly comprising:
   a rod guide;
   a seal cover engaging the rod guide and defining an area therebetween;
   a retainer engaged with the seal cover;
   a first O-ring disposed between the seal cover and the rod guide; and
   a second O-ring disposed between the rod guide and the retainer.

2. The guide assembly of claim 1 further comprising a rod seal engaging the rod guide, the rod seal being adapted to engage the rod of the strut.

3. The guide assembly of claim 1 further comprising a third O-ring disposed proximate an outer surface of the seal cover.

4. The guide assembly of claim 1 wherein the rod guide comprises aluminum.

5. The guide assembly of claim 1 wherein the rod guide comprises a lubricious coating.

6. The guide assembly of claim 1 wherein the area between the seal cover and the rod guide is annulus-shaped.

7. The guide assembly of claim 1 wherein the area between the seal cover and the rod guide is filled with grease.

8. The guide assembly of claim 1 wherein the seal cover comprises steel.

9. The guide assembly of claim 1 wherein the seal cover comprises a plating.

10. The guide assembly of claim 1 wherein the seal cover comprises a Teflon-impregnated nickel plating.

11. A strut for a motor vehicle, the strut comprising:
    body;
    a rod slidable within the body; and
    a guide assembly including:
      a rod guide;
      a seal cover engaging the rod guide and defining an area therebetween;
      a retainer engaged with the seal cover;
      a first O-ring disposed between the seal cover and the rod guide; and
      a second O-ring disposed between the rod guide and the retainer.

12. The strut of claim 11 further comprising a rod seal engaging the rod guide, the rod seal being adapted to engage the rod.

13. The strut of claim 11 further comprising a third O-ring disposed proximate an outer surface of the seal cover.

14. The strut of claim 11 wherein the rod guide comprises aluminum.

15. The strut of claim 11 wherein the rod guide comprises a lubricious coating.

16. The strut of claim 11 wherein the area between the seal cover and the rod guide is annulus-shaped.

17. The strut of claim 11 wherein the area between the seal cover and the rod guide is filled with grease.

18. The strut of claim 11 wherein the seal cover comprises steel.

19. The strut of claim 11 wherein the seal cover comprises a Teflon-impregnated nickel plating.

20. A strut for a motor vehicle, the strut comprising:
    a body;
    a rod slidable within the body; and
    a guide assembly including:
      a rod guide having a lubricious coating;
      a seal cover engaging the rod guide and defining an annulus-shaped area therebetween;
      a retainer engaged with the seal cover;
      a first O-ring disposed between the seal cover and the rod guide;
      a second O-ring disposed between the rod guide and the retainer;
      a rod seal engaging the rod guide, the rod seal being adapted to engage the rod; and
      a third O-ring disposed proximate an outer surface of the seal cover.

* * * * *